Figure 1:
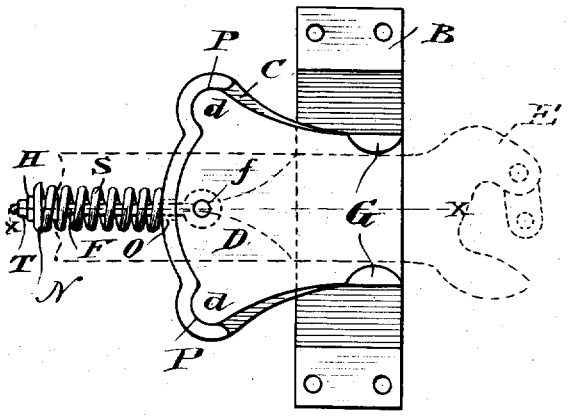

No. 12,106. REISSUED APR. 28, 1903.

E. F. CHAFFEE.

CENTERING DEVICE FOR CAR COUPLINGS.

APPLICATION FILED AUG. 20, 1902.

Witnesses,
F. E. Mann,
S. N. Pond.

Inventor:
Edward F. Chaffee,
By Offield, Towle & Linthicum
Att'ys.

UNITED STATES PATENT OFFICE.

EDWARD F. CHAFFEE, OF ALBANY, NEW YORK.

CENTERING DEVICE FOR CAR-COUPLINGS.

SPECIFICATION forming part of Reissued Letters Patent No. 12,106, dated April 28, 1903.

Original No. 656,438, dated August 21, 1900. Application for reissue filed August 20, 1902. Serial No. 120,731.

*To all whom it may concern:*

Be it known that I, EDWARD F. CHAFFEE, a citizen of the United States of America, and a resident of the city of Albany, county of Albany, State of New York, have invented certain new and useful Improvements in Centering Devices for Car-Couplers, of which the following is a specification.

My invention relates to centering devices whose function is to automatically keep the couplers of railway-cars at the center of the end of the car when at rest, and when forced away from the center, as by going around curves, to return the draw-bar and coupler to the center.

A fault which inheres in all existing types of couple-centering devices with which I am acquainted resides in the fact that the spring-held guide or saddle in which the draw-bar rests and which engages the latter on its opposite sides, yielding when the draw-bar is drawn to one side, as by going around a curve, and automatically pressing the draw-bar back to central position when again on straight track or when the cars are uncoupled, moves simply in lines which are always substantially at right angles to the longitudinal axis of the car, and this results necessarily in a considerable degree of rub and consequent wear between said guide or saddle and the sides or other parts of the draw-bar contacted thereby.

One of the principal objects of my invention, therefore, is to obviate this objection through the provision of a device wherein the contacting portion or portions of the guide or saddle during the outward and inward swing of the draw-bar have a movement in a direction other than substantially at right angles to the longitudinal center line of the car, and preferably a zero or a minimum movement longitudinally of the draw-bar; and this object I carry out by means of a construction wherein the elastically-actuated guiding and operating means for the draw-bar when in action move in other than a path at right angles to the longitudinal center line of the car and occupy positions at constantly-varying distances from a line at right angles to the normal central position of the draw-bar. In the preferred form of my invention, hereinafter described, this draw-bar guide is fulcrumed on a stationary support carrying the same.

Another object of my invention is to provide a centering device having an elastic operating medium the strength of which may be readily increased or diminished at will. Heretofore the operating means in such devices have generally consisted of two springs located one on either side of the draw-bar. These springs have been confined ordinarily between fixed and limited boundaries in which, necessarily, the amount of movement obtainable was small. As a consequence the springs have as a general thing soon become set and their efficiency in centering the draw-bar greatly lessened, and as no means were employed to readjust the springs to increased tension the device has either lost much of its original efficiency or has become in numerous cases entirely inoperative. My present invention presents the first device wherein the elastic operating medium, no matter what its nature or the number and location of its parts, is provided with means whereby the elastic effect of said operating medium may be increased or decreased as may be desired.

Still another object of my invention is to provide a construction wherein the elastic medium employed to center the draw-bar is not required to have a yielding movement coextensive with the lateral movement of the bar-engaging part or parts; and this object I accomplish through the interposition of a connection in the form of a draw-bar guide between said elastic medium and the draw-bar of such a nature that the extent of movement of said connection at the point where it engages the draw-bar produces a reduced extent of movement at the point at which it engages the elastic medium, thus effecting a reduced tensional or compressional movement of the medium itself.

To these ends my invention resides in a centering device of the character described possessing the capabilities hereinabove specified and distinguished by the novel features of construction and principle and mode of operation hereinafter more particularly set forth and claimed.

Figure 2:
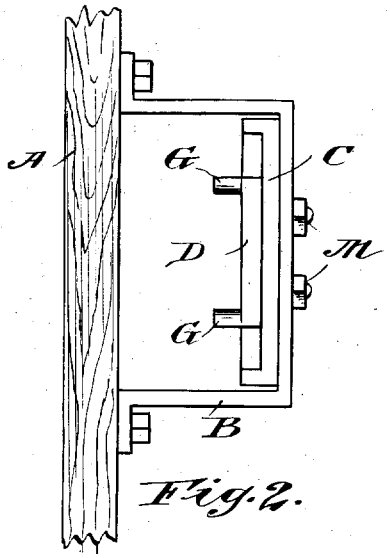
Figure 3:
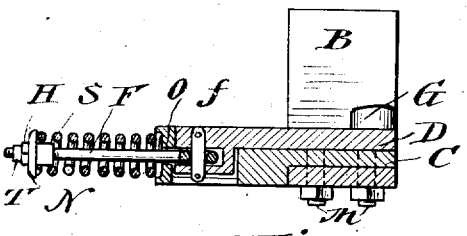
Figure 4:
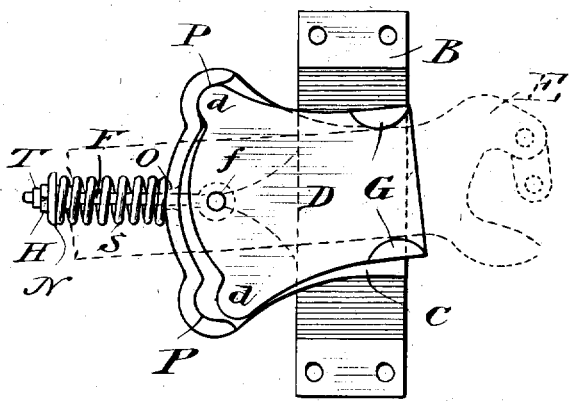

In the accompanying drawings, Figure 1 is a plan view of my attachment at rest in normal position. Fig. 2 is an end view. Fig. 3 is a section of Fig. 1 at X X in elevation. Fig. 4 is a plan view of my attachment when the coupler is moved to one side from the center.

Similar letters refer to similar parts throughout the several views.

A represents the head block or beam across the end of the car, to which the hanger is attached, upon which the coupler rests.

B is a hanger within which the coupler rests. C is a stationary bed-plate in said hanger, and D is a movable table or plate resting upon the stationary bed-plate and constituting in this embodiment of my invention the draw-bar guide and immediate operating means. The dotted lines E in Figs. 1 and 4 represent a coupler or draw-bar as ordinarily used. The plate C is held stationary on the bottom of the hanger B by the bolts M M or by any suitable means, and the rear side or end of the bed-plate C is raised, so as to equal in height the top face of the plate D, and is formed with curved recesses P P in the rear corners. It also has an opening O in the back raised end for the eyebolt F to pass through. The movable plate D may be of very much the same form as the stationary bed-plate C. It rests upon the stationary plate C and has curved corners *d d*, which fit into and fulcrum upon the curved recesses P P of the bed-plate C, so as to turn upon them as pivots in either direction. It is also provided with projections or buffers G G for the draw-bar to strike against when forced one way or the other. The plate D is held in position by eyebolt F, being attached thereto by any suitable means, as by the key-bolt *f*, and extending backward through the opening O in the raised portion of the stationary bed-plate C. This rod is provided with a coiled spring S. One end of the coiled spring S rests in a recess in the back of the stationary bed-plate C and the other end against the bushing N, which in turn is held by the adjusting-nut H on the end of the rod F. The adjusting-nut H may be held by the lock-nut T or by any well-known means.

The operation of my centering device is as follows: Any kind of a car-coupler or draw-bar, as in ordinary use, may be attached to the car in the usual way and rest upon the top of the movable plate D between the buffers G G. When the car goes around a curve or from any cause the coupler is forced to one side, it will strike one of the buffers G G and force the plate D to turn upon the pivot *d* upon the side to which the coupler is forced. This will draw the bolt F in toward the end of the car and through the opening O, and so will compress the coiled spring S, as shown in Fig. 4. When the force which moved the coupler to one side is removed, the coiled spring will draw the plate D back into its original position, as shown in Fig. 1, which will hold the coupler in the center of the car. When the cars are equipped with my attachment, as herein described, the couplers will always be in the center of the car when it is desired to couple the cars together, and the cars may be coupled together upon curves as well as upon the straight track. When the spring S becomes weakened by use, it may be readily tightened by the adjusting-nut H or the spring may be easily replaced by a new spring without removing other parts of the equipment. When the spring is properly adjusted, it may be retained in any desired tension by the lock-nut T or by any known means.

From the foregoing it will be seen that whenever the plate D is swung to one side or the other that buffer G which is engaged by the side of the draw-bar does not move in a straight line at right angles to the longitudinal center line of the car, but travels in a curved path, which, while not strictly coincident with the arc through which that point of the draw-bar contacted thereby moves, is so nearly coincident therewith as to practically eliminate rub and wear between the contacting parts. This I regard as an important feature of my invention, and believing myself to be the first to provide a centering device having such a movement relatively to the draw-bar I do not limit myself to the construction shown and described or any other particular construction for effecting this novel result. Furthermore, it has heretofore been customary where one or more springs have been employed to have these so located that their lines of stress have been in a direction substantially at right angles to the longitudinal center line of the car, and consequently the amount and effect of such stress has been limited, whereas in the preferred form of my device, wherein a single spring is used, said spring is located otherwise than transversely of the car, and may therefore have greater freedom of action, especially when positioned, as herein shown, in line with the length of the car; but in view of the fact that the plate D constitutes a lever connection between the centering-spring and the draw-bar, with its longer arm in engagement with the latter and its shorter arm connected to the spring, a given lateral swing of the free end of the draw-bar produces a considerably-reduced longitudinal compressing movement of the spring. Such a function is obviously of value, however the spring may be located.

My centering device is simple, economical, and very effective. My device when attached to cars occupies less room than the attachments now in use, and so interferes less with the proper arrangement of the steam and air connections, and is very convenient and desirable for practical use.

I claim—

1. A centering device for a car-coupler comprising in combination with the draw-bar and a support therefor, a guide engaging the draw-bar and having movement therewith in a curved path, and means for returning the guide and draw-bar to normal position, substantially as described.

2. A centering device for a car-coupler consisting of a stationary support, a draw-bar guide carried thereby, the bar-engaging part or parts of said guide being movable laterally of the draw-bar and during such movement occupying positions at continuously-varying distances from a line at right angles to the longitudinal center line of the car, and elastic means acting upon said guide to normally maintain the draw-bar in such central position, substantially as described.

3. A centering device for a car-coupler consisting of a stationary support, a fulcrumed draw-bar guide carried thereby, and elastic means controlling said guide and through the latter normally tending to return the draw-bar to central position relatively to the end of the car, substantially as described.

4. The combination with the draw-bar of a car-coupler, of a single elastic means for centering the same when displaced to either side, and means whereby the centering force exerted by said centering means upon said draw-bar may be increased or diminished as desired, substantially as described.

5. A coupler-centering device comprising in combination coupler-guiding means having movement other than substantially at right angles to the longitudinal center line of the car, a medium operating to center the coupler, and means whereby the centering force of said medium may be increased or diminished, substantially as described.

6. A centering device for a car-coupler consisting of a stationary support, a draw-bar guide carried thereby and fulcrumed thereon, the bar-engaging parts of said guide being movable laterally of the draw-bar and during such movement occupying positions at continuously-varying distances from a line at right angles to the longitudinal center line of the car, and a single spring connected with and tending to center said guide and draw-bar when drawn to either side, substantially as described.

7. In a centering device for car-couplers, the combination with a draw-bar and an elastic medium normally tending to center said draw-bar, of a draw-bar guide interposed between said draw-bar and said elastic medium, through which a given extent of lateral movement of the draw-bar-engaging part or parts of said guide produces a less extent of yielding movement of the elastic medium, substantially as described.

8. A centering device for a car-coupler consisting of a stationary bed-plate; a movable plate mounted thereon and adapted to turn on a curve with the coupler in either direction; and a spring connecting said movable plate with said bed-plate and adapted to return said movable plate into position when turned in either direction, substantially as described.

9. In a centering device for a car-coupler, a stationary bed-plate mounted upon a hanger under a car; a movable plate mounted thereon adapted to be turned on a curve horizontally a limited distance in either direction upon said bed-plate; a spring attached to said movable plate and bearing against said bed-plate, adapted to return said movable plate into position when turned in either direction, in combination with a car-coupler mounted upon said movable plate and adapted to turn said plate, substantially as described and for the purposes set forth.

10. In a centering device for a car-coupler, a stationary bed-plate mounted upon and secured to a hanger under a car, said bed-plate having curved recesses at its rear corners; a movable plate or table mounted upon said bed-plate, said movable plate having projections or buffers on each side and curved rear corners adapted to fit into the curved recesses at the corners of the bed-plate, said top plate or table being adapted to turn a limited distance in either direction upon said curved corners as pivots; a spring connecting said movable top plate with said stationary bed-plate, and adapted to hold said curved corners of said top plate into the curved recesses of the bed-plate, and when the said plate is turned upon one of said curved corners as a pivot to return said plate again to position and a car-coupler adapted to rest upon said top plate between said projections or buffers, substantially as described and for the purposes set forth.

11. In a centering device for a car-coupler, a hanger under a car adapted to support a car-coupler; a stationary bed-plate in said hanger; a movable plate mounted on said bed-plate and adapted to hold said coupler thereon and to turn in either direction of the said coupler; a spring connecting said movable plate with said bed-plate and adapted to return said movable plate into position when moved in either direction, and means for adjusting said spring to any desired tension, substantially as described and for the purposes set forth.

In testimony that I claim the foregoing as my invention I have signed my name to this specification in the presence of two subscribing witnesses.

EDWARD F. CHAFFEE.

Witnesses:

FREEMAN S. ARNOLD,
SANFORD W. FRYE.